(12) United States Patent
Schlosser

(10) Patent No.: US 9,696,123 B2
(45) Date of Patent: Jul. 4, 2017

(54) METHOD FOR FOCUSING A HIGH-ENERGY BEAM ON A REFERENCE POINT ON THE SURFACE OF A FLYING OBJECT IN FLIGHT

(71) Applicant: MBDA Deutschland GmbH, Schrobenhausen (DE)

(72) Inventor: Wolfgang Schlosser, Gräfelfing (DE)

(73) Assignee: MBDA DEUTSCHLAND GMBH, Schrobenhausen (DE)

( * ) Notice: Subject to any disclaimer, the term of this patent is extended or adjusted under 35 U.S.C. 154(b) by 146 days.

(21) Appl. No.: 15/167,005

(22) Filed: May 27, 2016

(65) Prior Publication Data
US 2017/0059282 A1    Mar. 2, 2017

(30) Foreign Application Priority Data

May 29, 2015    (DE) .................... 10 2015 007 028

(51) Int. Cl.
| | |
|---|---|
| *B64D 1/04* | (2006.01) |
| *F41F 5/00* | (2006.01) |
| *F41H 13/00* | (2006.01) |
| *F41G 5/08* | (2006.01) |
| *G01S 13/58* | (2006.01) |
| *G01S 13/66* | (2006.01) |

(Continued)

(52) U.S. Cl.
CPC .......... *F41H 13/0062* (2013.01); *F41G 3/165* (2013.01); *F41G 5/08* (2013.01); *F41H 11/02* (2013.01); *G01S 13/58* (2013.01); *G01S 13/66* (2013.01); *G01S 13/867* (2013.01); *G06T 7/251* (2017.01); *G06T 7/60* (2013.01); *G06T 2207/10016* (2013.01); *G06T 2207/10028* (2013.01); *G06T 2207/30204* (2013.01); *G06T 2207/30212* (2013.01); *G06T 2207/30241* (2013.01)

(58) Field of Classification Search
CPC ...... F41H 13/0062; F41H 11/02; G06T 7/251; G06T 7/60; F41G 3/165; F41G 5/08; G01S 13/58; G01S 13/66; G01S 13/867
USPC ........................................................... 89/1.11
See application file for complete search history.

(56) References Cited

U.S. PATENT DOCUMENTS

| | | | |
|---|---|---|---|
| 6,754,368 B1 * | 6/2004 | Cohen .................. | G01S 7/4008 348/143 |
| 7,765,083 B2 * | 7/2010 | Zank ........................ | G01S 5/00 702/150 |

(Continued)

*Primary Examiner* — Samir Abdosh
(74) *Attorney, Agent, or Firm* — Lorenz & Kopf, LLC

(57) ABSTRACT

A method for focusing a beam of a high energy radiation source on a reference point on the surface of a flying object, comprising:
   recording a number of consecutive two-dimensional images of the flying object
   determining the trajectory of the flight path simultaneously determining the line of sight angle between the image acquisition device and the position of the flying object
   calculating a three-dimensional model of the flying object
   displaying the currently acquired two-dimensional image
   marking the reference point on the displayed two-dimensional image of the flying object;
   calculating the three-dimensional reference point on the surface of the flying object
   focusing the beam of the high energy radiation source on the three-dimensional reference point.

11 Claims, 1 Drawing Sheet

(51) Int. Cl.
*G01S 13/86* (2006.01)
*F41G 3/16* (2006.01)
*F41H 11/02* (2006.01)
*G06T 7/60* (2017.01)
*G06T 7/246* (2017.01)

(56) References Cited

U.S. PATENT DOCUMENTS

| | | | |
|---|---|---|---|
| 7,773,204 B1* | 8/2010 | Nelson | G01S 13/48 |
| | | | 356/5.02 |
| 8,941,042 B2* | 1/2015 | Hutchin | F41H 13/0062 |
| | | | 250/201.9 |
| 9,103,907 B2* | 8/2015 | Sebastian | G01C 11/02 |
| 2008/0167835 A1* | 7/2008 | Zank | G01S 5/00 |
| | | | 702/151 |
| 2010/0259594 A1* | 10/2010 | Johansson | G01S 13/08 |
| | | | 348/43 |
| 2010/0271615 A1* | 10/2010 | Sebastian | G01C 11/02 |
| | | | 356/4.01 |

* cited by examiner

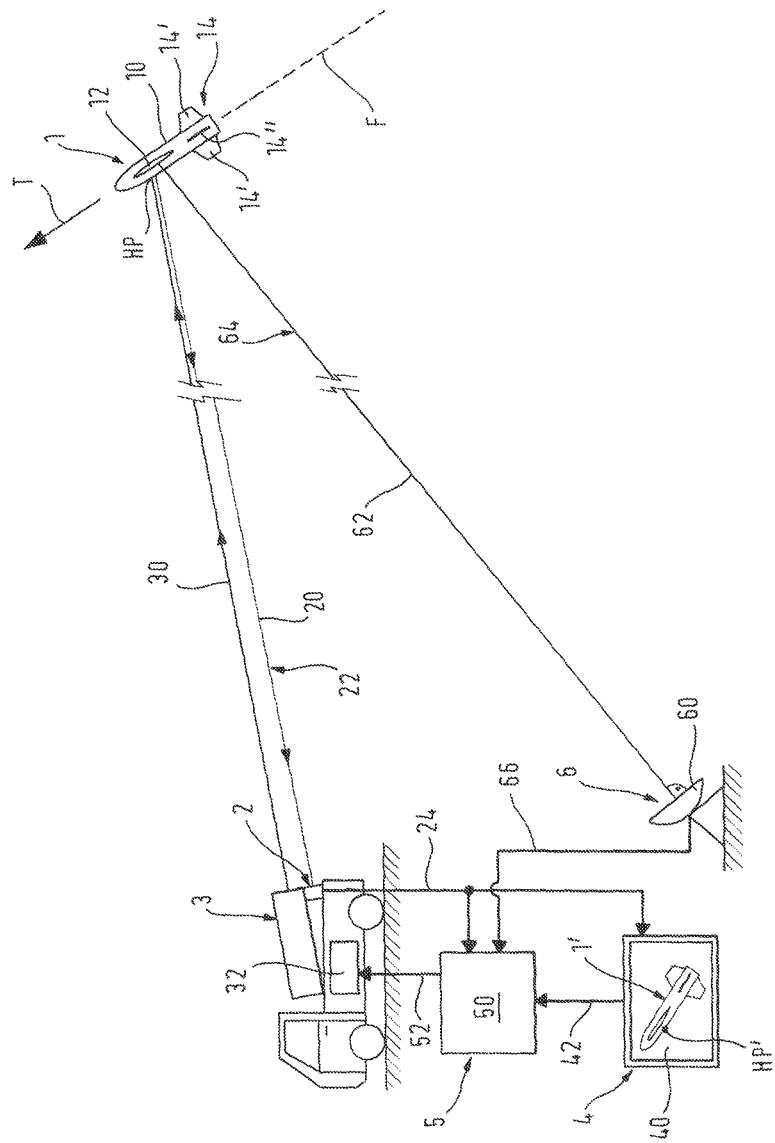

METHOD FOR FOCUSING A HIGH-ENERGY BEAM ON A REFERENCE POINT ON THE SURFACE OF A FLYING OBJECT IN FLIGHT

CROSS-REFERENCE TO RELATED APPLICATIONS

This application claims priority to German Application No. 10 2015 007 028.2, filed May 29, 2015, which is hereby incorporated by reference in its entirety.

TECHNICAL FIELD

The embodiments described herein relate to a method for focusing a beam of a high energy radiation source on a reference point on the surface of a flying object in flight. The beam of the high energy radiation source is preferably a high energy laser beam.

BACKGROUND

In addition, other objects, desirable features and characteristics will become apparent from the subsequent summary and detailed description, and the appended claims, taken in conjunction with the accompanying drawings and this background.

When combating flying targets with high energy beam weapons, it is imperative to focus as much radiated energy as possible on a point on the surface of the flying object in question as rapidly as possible. According to standard practice, sites called "feature points", which are identifiable using specific features of a flying object, are selected on a two-dimensional image of the object as reference points for tracking the target and used for calculating a reference point for focusing the high energy beam. Because the third dimension is missing from this approach, even relatively small changes in aspect angle or the slightest flying manoeuvre of the flying target make it impossible to track the reference point exactly. Furthermore, a three-dimensional movement of the flying object in space causes the features in the area surrounding the reference point to change, so that the one or more feature points used to define the reference points may no longer be identifiable, and a reference point marked on the two-dimensional image of the flying object for example may disappear completely or a reference point that is referenced using several focus points may be shifted significantly. All of these disadvantages combine to make it impossible to focus the high energy beam rapidly and effectively on a point on the surface of the flying object.

SUMMARY

There may be a need to provide a method for focusing a beam from a high energy radiation source on a reference point on the surface of a flying object in flight, with which it is possible to maintain the focus for a prolonged period once it has been established, and to destroy the flying object as rapidly and effectively as possible.

According to one embodiment, in the method for focusing a beam from a high energy radiation source on a reference point on the surface of a flying object in flight, the following steps are carried out: a) Recording a number of consecutive two-dimensional images of the flying object in flight with an imaging method using an image acquisition device; b) Determining the trajectory of the flying object's flight path as a sequence of three-dimensional waypoint; c) Simultaneously determining the line of sight angle between the image acquisition device and the position of the flying object in synchronisation with the image; d) Calculating a three-dimensional model of the flying object from the two-dimensional images recorded in step a) on the basis of the relative geometry to be calculated from the line of sight angles calculated in step c) and the trajectory obtained in step b), and on the basis of predefined model assumptions about the flying object; e) Displaying the currently acquired two-dimensional image of the flying object in flight via an image reproduction device; f) Marking the reference point on the displayed two-dimensional image of the flying object; g) Calculating the three-dimensional reference point on the surface of the flying object starting from the two-dimensional reference point marked in step f) using the three-dimensional model of the flying object calculated in step d), and h) Focusing the beam of the high energy radiation source on the three-dimensional reference point and causing the focus point of the beam directed at the reference point to track said reference point.

The trajectory of the flying object is measured for example as a sequence of three-dimensional waypoints by means of an "external" device (e.g., a radar system) and converted into three-dimensional waypoints synchronised temporally with the images. A three-dimensional model of the flying object is calculated from the two-dimensional images of the flying object with the aid of very simple model assumptions about the flying object based on the knowledge of the relative geometry gained in step d) and using the flight trajectory calculated in step b). In this context, the term relative geometry is understood to mean the position of the significant three-dimensional axes of the flying object (e.g., axis of the fuselage, axis of the wings, etc.) relative to the line of sight of the image acquisition device.

A two-dimensional reference point marked in a two-dimensional image of the flying object shown "online" in a display device is projected onto the model and converted into a corresponding three-dimensional reference point, and this three-dimensional reference point is then projected into the subsequent images. The high energy beam is then focused on the object and tracks after it based on this three-dimensional reference point. In this way, it is possible to achieve a significantly longer focusing time on the reference point than was previously the case, if the aspect angle of the recording device changes for image acquisition of the flying object in flight, or even if the flying object carries out flying manoeuvres that change the flight attitude of the flying object in space.

Thus, a significantly higher degree of precision is achieved when tracking a marked three-dimensional reference point in the two-dimensional image than when tracking a two-dimensional reference point. The risk of losing the reference point if the flying object undertakes flying manoeuvres is also reduced considerably. The method also makes it possible to calculate the geometric visibility or concealment of the reference point, so that the emission of the high energy beam can be stopped if the reference point is no longer visible or is obscured by other parts of the flying object, thus reducing the risk of endangering third parties due to unnecessary radiation. Moreover, with the method the use of general, very simple model assumptions means that it is not absolutely necessary to have a range of three-dimensional target models of certain flying objects ready for use, which must then first be identified.

The method according to one embodiment is used to particularly good advantage if the beam of the high energy radiation source is a laser beam, and the radiation source is thus a laser radiation source.

It is particularly advantageous if the imaging method is an optical image acquisition method, preferably a high resolution optical image acquisition method in the visible or infrared spectral range. With such an image acquisition system, it is possible to achieve reliable, precise target object acquisition even over great distances.

It is also advantageous if a two-dimensional line model of the flying object's contour is first created from the recorded images of the flying object in flight in order to calculate the three-dimensional model in step d), and then depth information is added to the line model based on the knowledge of relative geometry, and finally the three-dimensional model is calculated using a predefined model assumption. This approach saves computing time and computing capacity.

In this context, it is particularly advantageous is one of the model assumptions is the assumption of a fuselage of the flying object that is cylindrical or consists of cylindrical sections.

It is also advantageous if one of the model assumptions is the assumption that the flying object has flat, board-like wings and/or aerodynamic control surfaces. These simplifying assumptions also help to reduce the computing effort required to calculate a three-dimensional model of the flying object "online" and extremely rapidly, that is to say practically in real time, without the need to carry out a complex identification of the flying object first, or use a specific model of the flying object.

It is also advantageous if further model assumptions are made about the relative orientation of and position of characteristic visible elements of the flying object, such as a wing or a vertical stabiliser, relative to the fuselage.

It is preferably sufficient to assume that the fuselage is symmetrical for the purpose of creating the three-dimensional model of the flying object.

It is also advantageous to assume that the angular position of the lengthwise axis of the fuselage is parallel to the tangent to the flight trajectory.

Preferred embodiments with additional design details and further advantages are described and explained in greater detail in the following text with reference to the accompanying drawing.

BRIEF DESCRIPTION OF THE DRAWING

The various embodiments will hereinafter be described in conjunction with the following drawing figures, wherein like numerals denote like elements.

FIG. 1 is a diagrammatic scene in which a flying object is captured simultaneously by a radar station and an electro-optical image acquisition device and engaged by means of a radiation source.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

FIG. 1 is a diagrammatic representation of a scene in which a flying object in flight 1 is captured simultaneously by an electro-optical image acquisition device 2 and a radar station 6 and engaged by means of a radiation source 3. Image acquisition device 2 is located as close as possible, or ideally in the radiation source 3, so that the high energy beam 30 emitted by radiation source 3 and image acquisition line of sight 20 of image acquisition device 2 have substantially parallel beam paths.

Flying object 1 is an unmanned aerial vehicle with a fuselage 10, wings 12 and aerodynamic control surfaces 14 (vertical stabiliser 14' and elevator unit 14"), travelling along a flight path F in the direction of a trajectory T.

In order to obtain waypoints on trajectory T of flying object 1, in the example shown a radar station 6 detects flying object 1 with radar beams 62 emitted along a radar line of sight 64 of radar antenna 60 and tracks it along flight path F. The information about flight trajectory obtained in this way is made provided with low latency to an image analysis device 5 (arrow 66).

The optical image signal beam 22 originating from flying object 1 is received and registered by the electro-optical image acquisition device and is supplied as image signal stream 24 to an image reproduction device 4. Consequently, two-dimensional images 1' of flying object 1 are displayed consecutively on a monitor 40 of image reproduction device 4. Image reproduction device 4 is coupled with image analysis device 5, to which the image signal stream 24 is also supplied.

In the two-dimensional image 1' of the flying object 1 displayed on monitor 40 of image reproduction device 4, an operator marks a reference point HP' on the surface of the displayed image 1' of flying object 1 as the target for focusing the high energy beam 30, a laser beam for example, emitted by radiation source 3. The two-dimensional coordinate data of this marked two-dimensional reference points HP' is supplied to image analysis device 5 as reference point data stream 42.

A computer 50 of image analysis device 5 first calculates a three-dimensional model of flying object 1 from the image data of flying object 1 received with image data stream 24 using predetermined simplified model assumptions for flying object 1. These simplified model assumptions assume for example that fuselage 10 of flying object 1 is substantially cylindrical or that it consists of cylindrical sections, and that the wings 12 and aerodynamic control surfaces 14 are flat and board-like. Model assumptions that are simplified in this way can be applied to practically any flying object, and enable the creation of a three-dimensional model of flying object 1 which is crude but adequate for the purpose at hand, without requiring the use of a specific model of the flying object in question, which if used would necessitate an identification of the flying object.

With this three-dimensional model and the relative geometry derived from the consecutively recorded images of flying object 1 and the temporally synchronised flight trajectory points on trajectory T, it is now possible to determine the attitude of flying object 1 in space and transfer the two-dimensional reference point HP' marked on monitor 40 from the two-dimensional coordinate data associated with the two-dimensional reference point HP' to the three-dimensional model as three-dimensional reference point HP. The coordinate data of this three-dimensional reference point HP is then transmitted as target object data stream 52 to a computer 32 of radiation source 3, which actuates alignment and focusing equipment (not shown) for the high energy beam 30 emitted by radiation source 3 in order to bring the focus point of high energy beam 30 into alignment with the three-dimensional reference point HP and to follow the movement of flying object 1 with beam 30 in such manner that the focus point remains coincident with three-dimensional reference point HP.

The method presupposes the availability of information about flight trajectory T, which can be determined from the radar information supplied by radar station 6. It is also necessary that image acquisition device 2 is located in a fixed position on the ground, and the line of sight angle in azimuth and elevation of image acquisition device 2 must also be known.

The following further simplified model assumptions are made:

The flying object 1 is flying in the direction of the longitudinal axis of its fuselage, the wings 12 are perpendicular thereto, and the vertical stabiliser 14' of the aerodynamic control surfaces 14 is in turn perpendicular to both, Fuselage 10 of flying object 1 consists of conical cylinder elements, and the wings and the vertical stabiliser are each "board-shaped".

The angle orientations of the primary axes of flying object 1 (fuselage, wings, vertical stabiliser) can be calculated in the image in advance from the line of sight angles and the data of the flight trajectory. A two-dimensional line model of the contour of flying object 1 is created using edge filters and logical connections adapted to these orientations. The lines of this model are classified by their associations (fuselage, control surfaces, vertical stabiliser) according to orientation and the model assumptions. Then, a virtual depth in the image can be added to the end points of the classified lines using a combination of line of sight angles and angle orientations of the primary axes. Finally, the virtual three-dimensional lines are transformed into a standard position for the three-dimensional model. Due to the variation over time of the image acquisition line of sight 20 and the flight trajectory T, small changes in the aspect angle in terms of azimuth and elevation are inevitable, and enable the model to be fine-tuned over time.

The model can also be improved by means of additional plausibility assumptions. For example, the position of the wings can be estimated based on the assumption that wings 12 are arranged symmetrically relative to fuselage 10. This symmetry can also be used to improve the model directly, by mapping the wings symmetrically relative to fuselage in the model.

Errors in the flight trajectory data can be compensated via a correction from the standard position by assuming that the fuselage axis of flying object 1 extends exactly parallel to the X-axis of the flight attitude, and the plane of the wings extends exactly parallel to the Y-axis of the flight attitude.

Reference signs in the claims, the description and the drawing serve purely to provide a better understanding of the embodiment, and are not intended to limit the scope of protection.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for focusing a beam of a high energy radiation source, particularly a laser beam, on a reference point on the surface of a flying object in flight, including the following steps:
    recording a number of consecutive two-dimensional images of the flying object in flight with an imaging method using an image acquisition device;
    determining the trajectory of the flight path of the flying object as a sequence of three-dimensional waypoints;
    simultaneously determining the line of a sight angle between the image acquisition device and the position of the flying object in synchronization with the image;
    calculating a three dimensional model of the flying object from the two-dimensional images recorded on the basis of the relative geometry to be calculated from the line of sight angles calculated and the trajectory obtained, and on the basis of predefined model assumptions about the flying object;
    displaying the currently acquired two-dimensional image of the flying object in flight via an image reproduction device;
    marking the reference point on the displayed two-dimensional image of the flying object;
    calculating the three-dimensional reference point on the surface of the flying object starting from the two-dimensional reference point marked using the three-dimensional model of the flying object calculated, and
    focusing the beam of the high energy radiation source on the three-dimensional reference point and causing the focus point of the beam directed at the reference point to track said reference point.

2. The method according to claim 1, wherein the imaging method is an optical image acquisition method in the visible or infrared spectral range.

3. The method according to claim 1, wherein for calculating the three-dimensional model in step d), first creating a two-dimensional line model of the contour of the flying object from the recorded images of the flying object in flight;
    then adding depth information to the line model using knowledge of the relative geometry, and
    finally calculating the three-dimensional model using predefined model assumptions.

4. The method according to claim 3, wherein one of the model assumptions is the assumption that the fuselage of the flying object is cylindrical or comprising cylindrical sections.

5. The method according to claim 3, wherein one of the model assumptions is the assumption that the wings and/or aerodynamic control surfaces of the flying object are flat and board-shaped.

6. The method according to claim 3, comprising: making further model assumptions about the relative orientation and position of characteristic visible elements of the flying object relative to the fuselage.

7. The method according to claim 1, wherein creating a three-dimensional model of the flying object using relative to the fuselage.

8. The method of claim 2, comprising:
    recording a number of consecutive two-dimensional images of the flying object in flight with an imaging method using an image acquisition device;
    determining the trajectory of the flight path of the flying object as a sequence of three-dimensional waypoints;

simultaneously determining the line of sight angle between the image acquisition device and the position of the flying object in synchronisation with the image;

calculating a three-dimensional model of the flying object from the two-dimensional images recorded on the basis of the relative geometry to be calculated from the line of sight angles calculated and the trajectory obtained, and on the basis of predefined model assumptions about the flying object;

displaying the currently acquired two-dimensional image of the flying object in flight via an image reproduction device;

marking the reference point on the displayed two-dimensional image of the flying object;

calculating the three-dimensional reference point on the surface of the flying object starting from the two-dimensional reference point marked using the three-dimensional model of the flying object calculated, and focusing the beam of the high energy radiation source on the three-dimensional reference point and causing the focus point of the beam directed at the reference point to track said reference point;

wherein for calculating the three-dimensional model, first creating a two-dimensional line model of the contour of the flying object from the recorded images of the flying object in flight;

then adding depth information to the line model using knowledge of the relative geometry, and finally calculating the three-dimensional model using predefined model assumptions.

9. The method of claim 2, comprising:

wherein one of the model assumptions is the assumption that the fuselage of the flying object is cylindrical or comprising cylindrical sections, wherein for calculating the three-dimensional model, first creating a two-dimensional line model of the contour of the flying object from the recorded images of the flying object in flight;

then adding depth information to the line model using knowledge of the relative geometry, and finally calculating the three-dimensional model using predefined model assumptions.

10. The method of claim 2, comprising:

wherein one of the model assumptions is the assumption that the wings and/or aerodynamic control surfaces of the flying object are flat and board-shaped, wherein for calculating the three-dimensional model, first creating a two-dimensional line model of the contour of the flying object from the recorded images of the flying object in flight;

then adding depth information to the line model using knowledge of the relative geometry, and finally calculating the three-dimensional model using predefined model assumptions.

11. The method of claim 1, comprising:

recording a number of consecutive two-dimensional images of the flying object in flight with an imaging method using an image acquisition device;

determining the trajectory of the flight path of the flying object as a sequence of three-dimensional waypoints;

simultaneously determining the line of sight angle between the image acquisition device and the position of the flying object in synchronisation with the image;

calculating a three-dimensional model of the flying object from the two-dimensional images recorded on the basis of the relative geometry to be calculated from the line of sight angles calculated and the trajectory obtained, and on the basis of predefined model assumptions about the flying object;

displaying the currently acquired two-dimensional image of the flying object in flight via an image reproduction device;

marking the reference point on the displayed two-dimensional image of the flying object;

calculating the three-dimensional reference point on the surface of the flying object starting from the two-dimensional reference point marked using the three-dimensional model of the flying object calculated, and focusing the beam of the high energy radiation source on the three-dimensional reference point and causing the focus point of the beam directed at the reference point to track said reference point;

the imaging method is an optical image acquisition method in the visible or infrared spectral range;

wherein for calculating the three-dimensional model, first creating a two-dimensional line model of the contour of the flying object from the recorded images of the flying object in flight;

then adding depth information to the line model using knowledge of the relative geometry, and finally calculating the three-dimensional model using predefined model assumptions;

one of the model assumptions is the assumption that the fuselage of the flying object is cylindrical or comprising cylindrical sections;

one of the model assumptions is the assumption that the wings and/or aerodynamic control surfaces of the flying object are flat and board-shaped;

making further model assumptions about the relative orientation and position of characteristic visible elements of the flying object relative to the fuselage;

creating a three-dimensional model of the flying object using relative to the fuselage.

* * * * *